United States Patent
Lee et al.

(10) Patent No.: US 11,924,871 B2
(45) Date of Patent: Mar. 5, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 17/451,916

(22) Filed: Oct. 22, 2021

(65) Prior Publication Data

US 2022/0132518 A1 Apr. 28, 2022

(30) Foreign Application Priority Data

Oct. 22, 2020 (KR) ........................ 10-2020-0137170

(51) Int. Cl.
*H04W 72/542* (2023.01)
*H04W 68/00* (2009.01)
*H04W 72/044* (2023.01)
*H04W 72/23* (2023.01)

(52) U.S. Cl.
CPC ....... *H04W 72/542* (2023.01); *H04W 68/005* (2013.01); *H04W 72/046* (2013.01); *H04W 72/23* (2023.01)

(58) Field of Classification Search
None
See application file for complete search history.

(56) References Cited

U.S. PATENT DOCUMENTS

| 2019/0215117 | A1* | 7/2019 | Lee | H04L 5/0048 |
| 2020/0037293 | A1* | 1/2020 | Reial | H04W 48/08 |
| 2022/0022160 | A1* | 1/2022 | Zhang | H04W 68/02 |

* cited by examiner

*Primary Examiner* — Alex Skripnikov
(74) *Attorney, Agent, or Firm* — LEE, HONG, DEGERMAN, KANG & WAIMEY

(57) ABSTRACT

Various embodiments of the present disclosure relate to a next-generation wireless communication system for supporting high data transfer rates beyond the 4th generation (4G) wireless communication system. According to the various embodiments, a method of transmitting and receiving signals in a wireless communication system and apparatus for supporting the same may be provided. In addition, other embodiments may also be provided.

14 Claims, 20 Drawing Sheets

FIG. 9

| PRACH configuration index | \multicolumn{14}{c|}{RACH slot (1ms)} |
|---|---|---|---|---|---|---|---|---|---|---|---|---|---|---|
| Symbol Index | 0 | 1 | 2 | 3 | 4 | 5 | 6 | 7 | 8 | 9 | 10 | 11 | 12 | 13 |
| 81 | A1 | A1 | A1 | A1 | A1 | A1 | | | | | | | | |
| 82 | | | | | | | | | A1 | A1 | A1 | | | |
| 100 | | | | | | | | | | A2 | | | | |
| 101 | A2 | | | A2 | | | A2 | | | | | | | |
| 127 | | A3 | | | | A3 | | | | | | | | |
| 128 | | | | | | | | A3 | | | | | | |
| 142 | | B1 | B1 | B1 | B1 | B1 | B1 | | | | | | | |
| 143 | | | | | | B1 | B1 | B1 | | | | | | |
| 221 | | A1 | A1 | A1 | A1 | A1 | A1 | | | | | | | |
| 222 | | | | | | A1 | A1 | A1 | | | | | | |
| 235 | A2 | | | A2 | | | B2 | | | | | | | |
| 236 | | | | | A2 | | | B2 | | | | | | |
| 251 | | A3 | | | | B3 | | | | | | | | |
| 252 | | | A3 | | | | B3 | | | | | | | |

(a) Repetition "on"

(b) Repetition "off"

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119 (a), this application claims the benefit of an earlier filing date and right of priority to Korean Patent Application No. 10-2020-0137170 filed on Oct. 22, 2020, the contents of which is hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service, and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to various embodiments of the present disclosure, a method of transmitting and receiving signals by a user equipment (UE) in a wireless communication system is provided.

The method may include: transmitting information on a mobility state of the UE; receiving configuration information on one or more specific beam resources for paging; and receiving a paging message on the specific beam resources based on measurement quality of the specific beam resources greater than or equal to a specific threshold. The specific beam resources may be determined based on one or more synchronization signal/sequence block (SSB) indices or one or more channel state information reference signals (CSI-RSs).

The information on the mobility state of the UE may include information on one or more SSB indices with highest quality in a serving cell or one or more SSB indices with quality greater than or equal to the specific threshold and reference signal received power (RSRP) or reference signal received quality (RSRQ) measurement values related to the one or more SSB indices.

The configuration information may include: 1) information on one or more cells; and 2) information on one or more specific SSB indices selected for the one or more cells among the one or more SSB indices included in the information on the mobility state of the UE.

The configuration information may include at least one of a random access channel (RACH) configuration available for the UE in radio resource control (RRC) IDLE or RRC INACTIVE mode, a threshold related to an SSB for paging, or a threshold related to a CSI-RS for paging.

The method may further include receiving a tracking reference signal (TRS), a CSI-RS, or a wake-up signal (WUS) related to at least one SSB index among the one or more SSB indices included in the information on the mobility state of the UE.

The method may further include receiving downlink control information (DCI) based on the one or more specific SSB indices.

The method may include receiving a transport block (TB) including the paging message over a physical downlink shared channel (PDSCH) based on the DCI.

The method may include: reselecting new beam resources based on the measurement quality of the specific beam resources less than the specific threshold; transmitting information on the new beam resources to a base station; receiving information on a second beam resource for paging based on the new beam resources; and receiving the paging message on the second beam resource.

The second beam resource may be determined from among the new beam resources selected by the UE.

A nonvolatile computer-readable medium having recorded thereon a program code for executing the method may be provided.

According to the various embodiments of the present disclosure, a UE operating in a wireless communication system is provided. The UE may include: a transceiver; and one or more processors connected to the transceiver.

The transceiver may be configured to: transmit information on a mobility state of the UE; receive configuration information on one or more specific beam resource for paging; and receive a paging message on the specific beam resources based on measurement quality of the specific beam resources greater than or equal to a specific threshold.

The specific beam resources may be determined based on one or more SSB indices or one or more CSI-RSs.

The configuration information may include: 1) information on one or more cells; and 2) information on one or more specific SSB indices selected for the one or more cells among the one or more SSB indices included in the information on the mobility state of the UE.

The transceiver may be configured to receive DCI based on the one or more specific SSB indices.

The transceiver may be configured to receive a TB including the paging message over a PDSCH based on the DCI.

The one or more processors may be configured to reselect new beam resources based on the measurement quality of the specific beam resources less than the specific threshold, and The transceiver may be configured to: transmit information on the new beam resources to a base station; receive information on a second beam resource for paging based on the new beam resources; and receive the paging message on the second beam resource. The second beam resource may be determined from among the new beam resources selected by the UE.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 9 illustrates an example of a RACH occasion defined in one RACH slot in the NR system;

DETAILED DESCRIPTION

Figure 1:
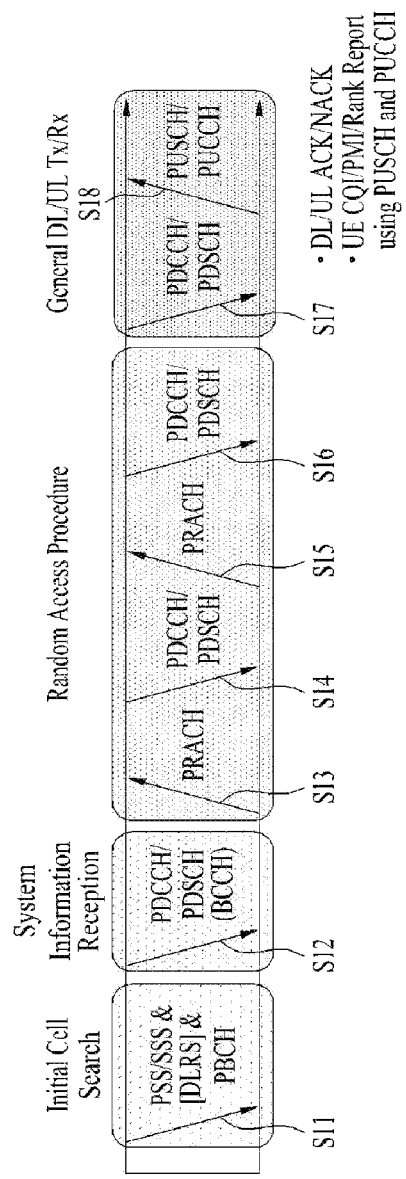
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification
Abbreviations and Terms
PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
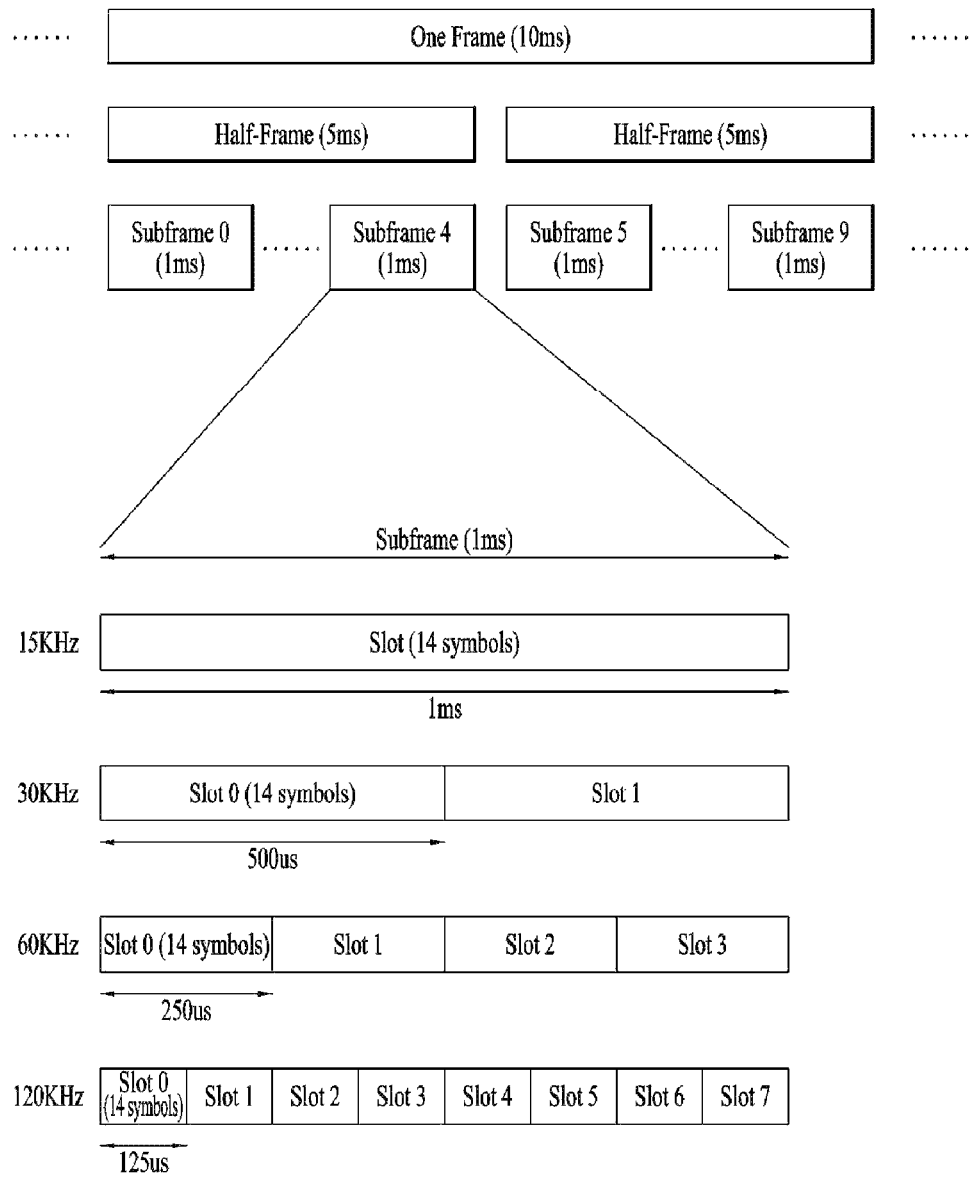
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
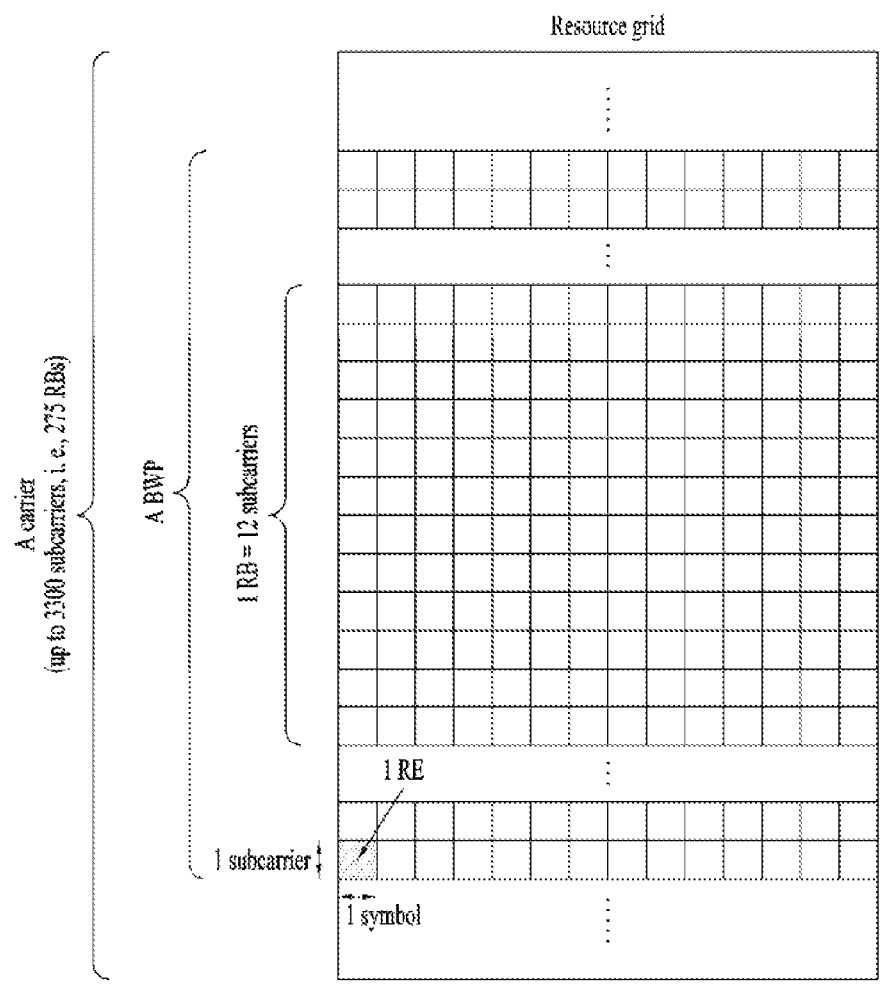
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
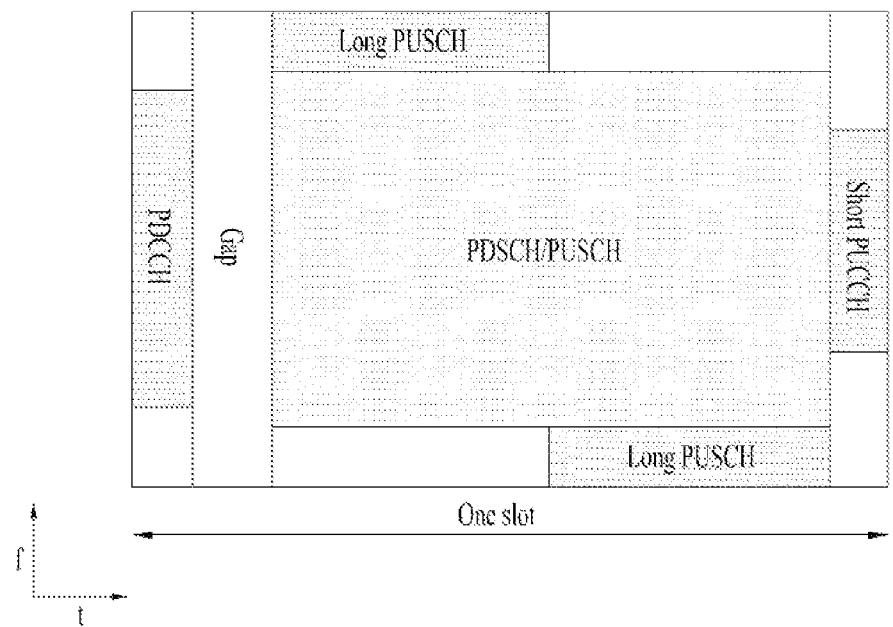
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
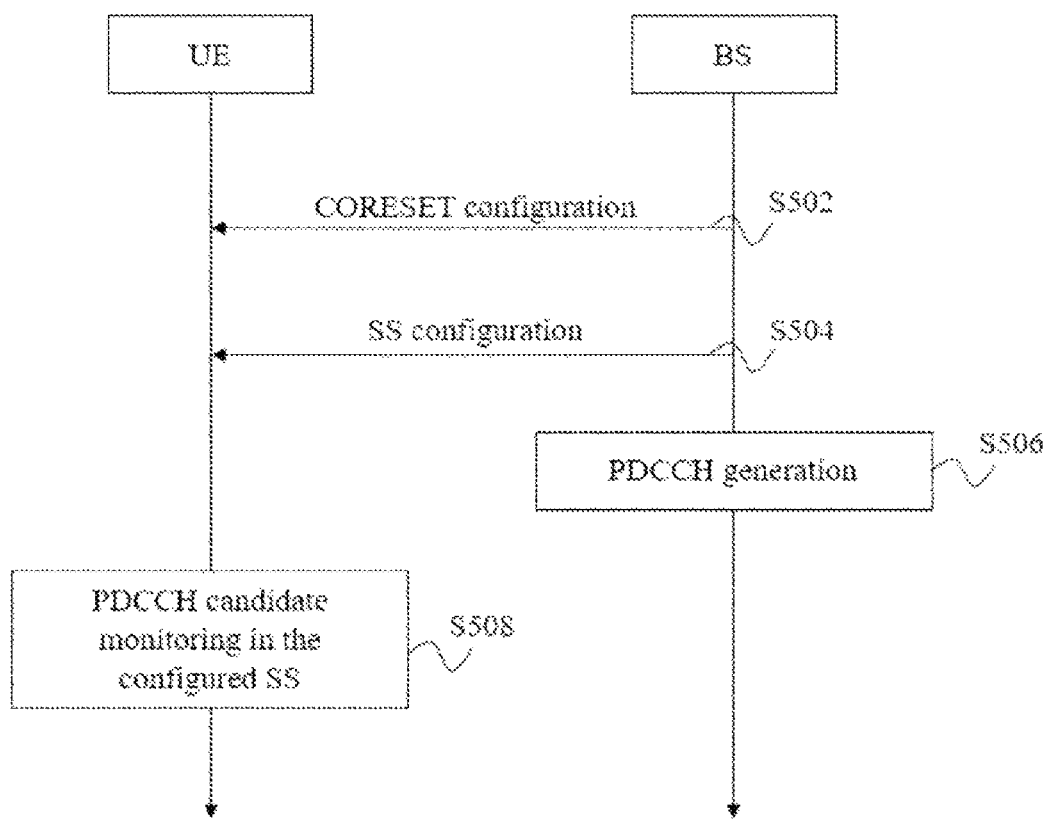
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={ 1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs | interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB} > 23$ for FR1 and if $k_{SSB} > 11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.

SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
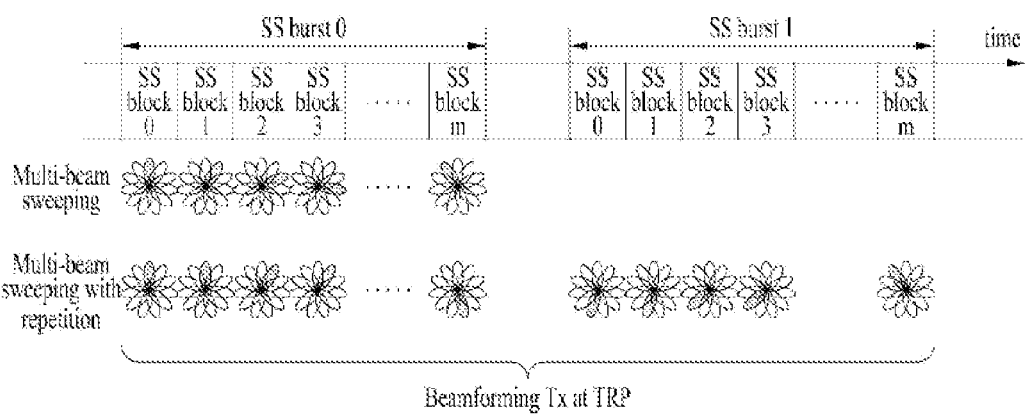
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
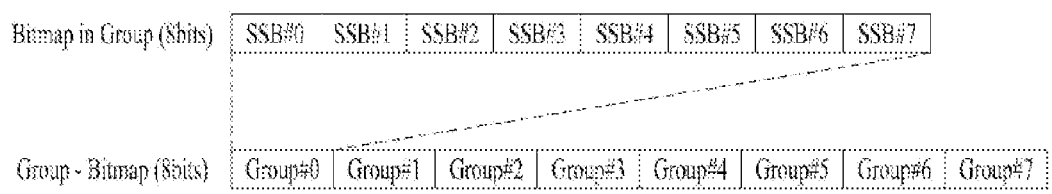
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.
- If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.
- If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
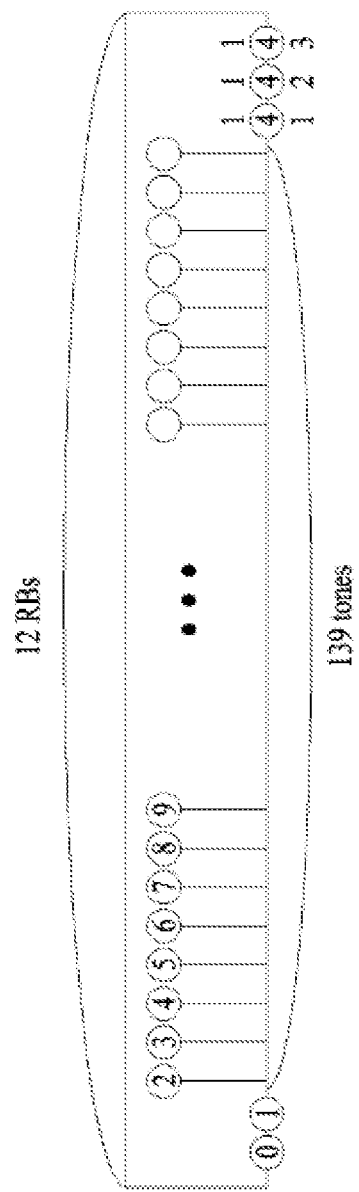
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, $\mu$ is 1. Table 5 shows Preamble formats for $L_{RA}=139$ and $\Delta f^{RA}=15\times 2^\mu$ kHz, where $\mu \in \{0,1,2,3\}$, $\kappa=T_s/T_c=64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4,9 | 0 | 1 | 6 | 2 |
| 82 | A1 | 1 | 0 | 7,9 | 7 | 1 | 3 | 2 |

TABLE 6-continued

| PRACH Configuration Index | Preamble format | $n_{SFN}$mod $x = y$ | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4,9 | 0 | 1 | 2 | 6 |
| 128 | A3 | 1 | 0 | 7,9 | 7 | 1 | 1 | 6 |
| 142 | B1 | 1 | 0 | 4,9 | 2 | 1 | 6 | 2 |
| 143 | B1 | 1 | 0 | 7,9 | 8 | 1 | 3 | 2 |
| 221 | A1/B1 | 1 | 0 | 4,9 | 2 | 1 | 6 | 2 |
| 222 | A1/B1 | 1 | 0 | 7,9 | 8 | 1 | 3 | 2 |
| 235 | A2/B2 | 1 | 0 | 4,9 | 0 | 1 | 3 | 4 |
| 236 | A2/B2 | 1 | 0 | 7,9 | 6 | 1 | 2 | 4 |
| 251 | A3/B3 | 1 | 0 | 4,9 | 0 | 1 | 2 | 6 |
| 252 | A3/B3 | 1 | 0 | 7,9 | 2 | 1 | 2 | 6 |

Referring to Table 6, information about the number of ROs defined in a RACH slot for each preamble format (i.e., $N_t^{RA,slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

Beam Management

Hereinafter, a beam management (BM) procedure defined by New Radio (NR) will be described. The BM procedure refers to layer 1/layer 2 (L1/L2) procedures for acquiring and maintaining a set of BS (e.g., gNB, TRP, etc.) beams and/or a set of UE beams available for downlink (DL) and uplink (UL) transmission/reception. The BM procedure may include the following processes and terminology.

Beam measurement: an operation by which a BS or UE measures the characteristics of a received beamformed signal Beam determination: an operation by which a BS or UE selects its transmission/reception (Tx/Rx) beam Beam sweeping: an operation of covering a spatial domain by using Tx and/or Rx beams for a prescribed period of time according to a predetermined method Beam reporting: an operation by which a UE reports information on a beamformed signal based on the beam measurement For the beam measurement, an SSB (or SS/PBCH block) or a channel state information reference signal (CSI-RS) may be used in DL, and a sounding reference signal (SRS) may be used in UL. In RRC_CONNECTED, the UE may measure multiple beams (or at least one beam) of a cell and average the measurement results (e.g., reference signal received power (RSRP), reference signal received quality (RSRQ), signal-to-interference-plus-noise ratio (SINR), etc.) to derive the cell quality. In doing so, the UE may be configured to consider a subset of the detected beam(s).

In the beam measurement, filtering may be performed at two different levels (at the physical layer to derive beam quality and at the RRC level to derive cell quality from multiple beams). The cell quality is derived from beam measurements in the same way for serving cell(s) and non-serving cell(s).

Figure 10:
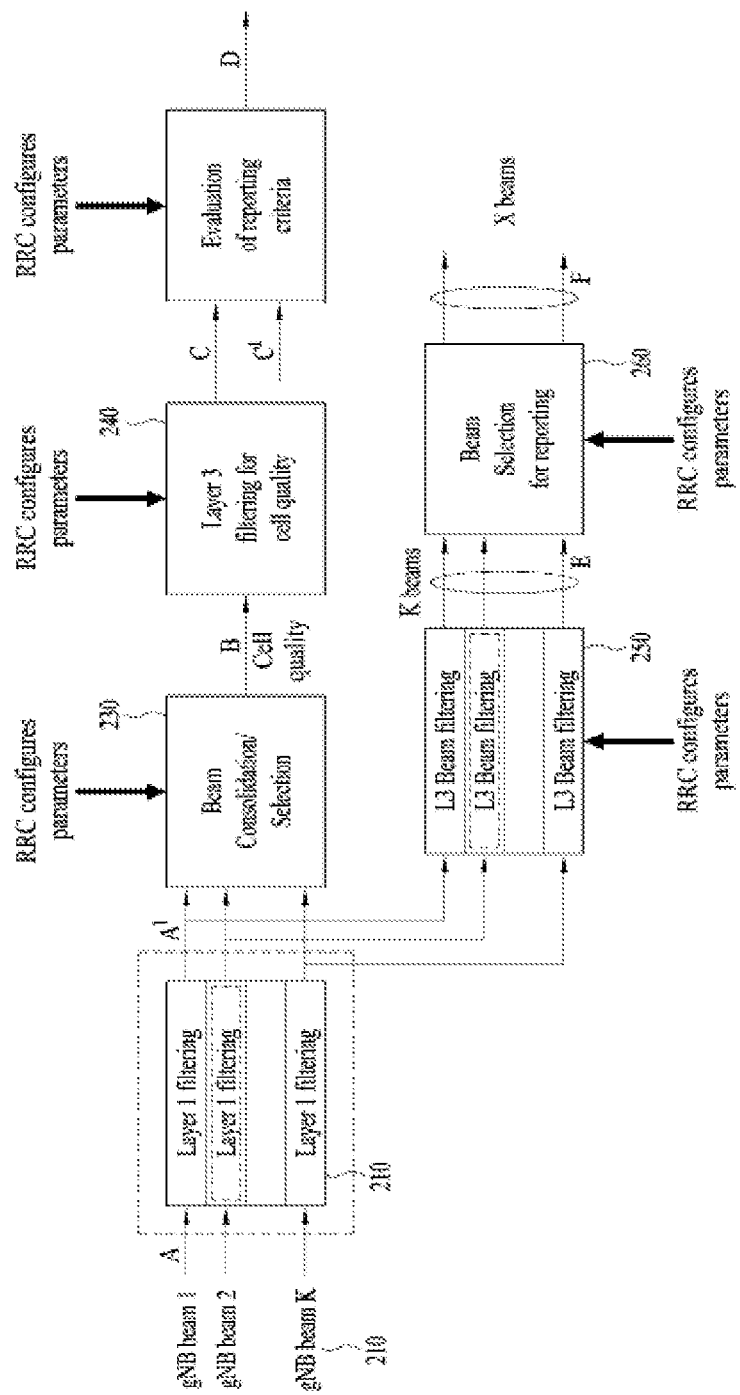
FIG. 10 illustrates an example of a beam related measurement model.

If the UE is configured to report measurement results for specific beam(s) by the gNB, the measurement report may include measurement results for X best beams. The beam measurement results may be reported as L1-RSRP. In FIG. 10, K beams 210 (gNB beam 1, gNB beam 2, . . . , gNB beam k) correspond to the measurements on SSB or CSI-RS resources configured for L3 mobility by the gNB and detected by the UE at L1. In FIG. 10, layer 1 filtering 220 refers to internal layer 1 filtering of an input measured at point A, and beam consolidation/selection 230 means that beam-specific measurements are consolidated (or merged) to derive cell quality. Layer 3 filtering for cell quality 240 refers to filtering performed on measurements provided at point B. The UE may evaluate reporting criteria at least every time a new measurement result is reported at points C and C1. D denotes measurement report information (message) transmitted over a radio interface. L3 beam filtering 250 refers to filtering performed on measurements (beam-specific measurements) provided at point A1. Beam selection for beam reporting 260 selects X measurements from measurements provided at point E. F denotes beam measurement information included in a measurement report (transmitted) over a radio interface.

The BM procedure may be divided into: (1) a DL BM procedure based on an SS/PBCH block or CSI-RS; and (2) a UL BM procedure based on an SRS. In addition, each BM procedure may include Tx beam sweeping for determining Tx beam(s) and Rx beam sweeping for determining Rx beam(s).

DL BM Procedure

First, the DL BM procedure will be described. The DL BM procedure may include: (1) transmission of beamformed DL reference signals (RSs) (e.g., CSI-RS or SSB) by the BS; and beam reporting by the UE. Here, the beam reporting may include preferred DL RS identifier(s) (ID(s)) and L1-RSRP thereof. The DL RS ID may be an SSB resource indicator (SSBRI) or a CSI-RS resource indicator (CRI).

Figure 11:
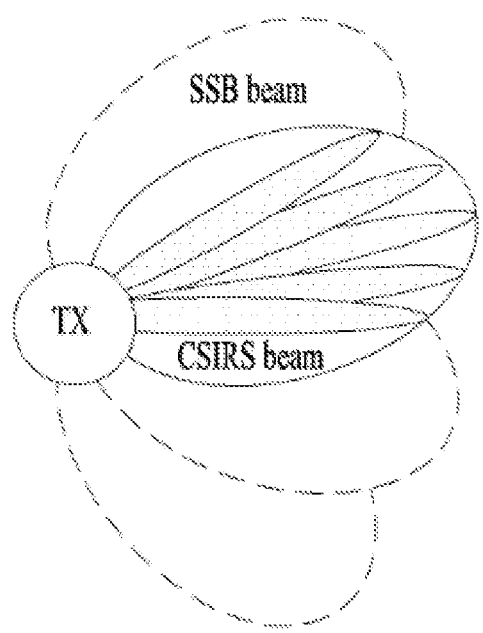
FIG. 11 illustrates an example of a Tx beam related to a DL beam management procedure.

FIG. 11 illustrates exemplary Tx beams related to the DL BM procedure.

As shown in FIG. 11, an SSB beam and a CSI-RS beam may be used for beam measurement. The measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping based on the SSB may be performed as follows: the UE changes Rx beams for the same SSBRI across multiple SSB bursts. Here, one SS burst may include one or more SSBs, and one SS burst set may include one or more SSB bursts.

DL BM Procedure Based on SSB

Figure 12:
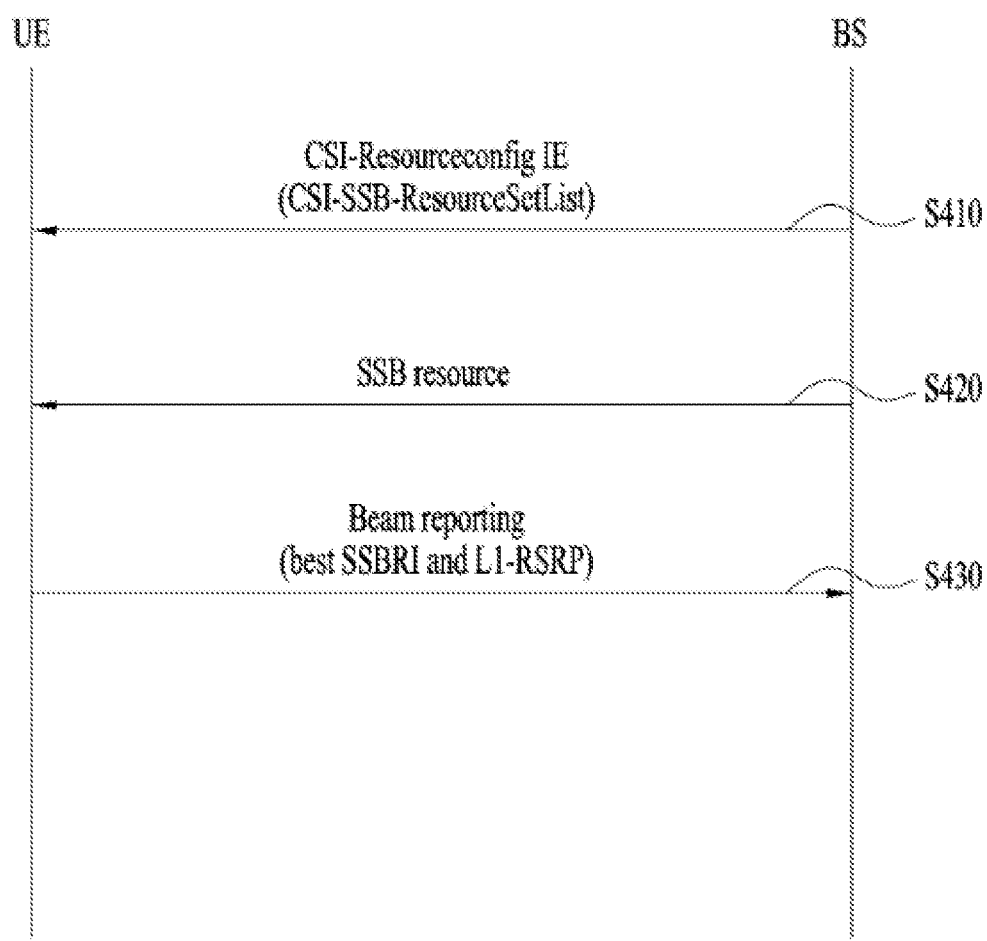
FIG. 12 is a flowchart illustrating an example of a DL beam management procedure using SSB.

FIG. 12 is a flowchart illustrating an exemplary DL BM procedure based on the SSB.

The configuration of a beam report based on the SSB may be performed when CSI/beams are configured in the RRC_CONNECTED state (or RRC_CONNECTED mode). As in the CSI-ResourceConfig information element (IE) of Table 7 below, the SSB may be set as a CSI-RS resource instead of separately defining a BM configuration based on the SSB. Table 7 shows an example of the CSI-ResourceConfig IE.

more CSI-RS resources in NZP-CSI-RS-ResourceSet may be transmitted in different OFDM symbols. Alternatively, the one or more CSI-RS resources in NZP-CSI-RS-ResourceSet may be transmitted in different frequency domains (by frequency division multiplexing). In the case of a multi-panel UE, the one or more CSI-RS resources may be frequency division multiplexed (FDMed). When repetition is set to 'ON', it may be related to the Rx beam sweeping process of the UE. In this case, the UE may not expect to receive different periodicities in periodicityAndOffset for all CSI-RS resources in NZP-CSI-RS-ResourceSet. When repetition is set to 'OFF', the UE may not assume that the one or more CSI-RS resources in NZP-CSI-RS-ResourceSet are transmitted through the same DL spatial domain transmis-

TABLE 7

```
-- ASN1START
-- TAG-CSI-RESOURCECONFIG-START
CSI-ResourceConfig ::=              SEQUENCE {
    csi-ResourceConfigId            CSI-ResourceConfigId,
    csi-RS-ResourceSetList              CHOICE {
        nzp-CSI-RS-SSB                      SEQUENCE {
            nzp-CSI-RS-ResourceSetList          SEQUENCE (SIZE (1...maxNrofNZP-CSI-RS-ResourceSetsPerConfig)) OF NZP-CSI-RS-
ResourceSetId OPTIONAL,
            csi-SSB-ResourceSetList                 SEQUENCE (SIZE (1..maxNrofCSI-SSB-ResourceSetsPerConfig)) OF CSI-SSB-R
esourceSetId OPTIONAL
        },
        csi-IM-ResourceSetList              SEQUENCE (SIZE (1...maxNrofCSI-IM-ResourceSetsPerConfig)) OF CSI-IM-ResourceSetId
    },
    bwp-Id                          BWP-Id,
    resourceType                    ENUMERATED { aperiodic, semiPersistent, periodic },
    ...
}
-- TAG-CSI-RESOURCECONFIGTOADDMOD-STOP
-- ASN1STOP
```

In Table 7, the parameter csi-SSB-ResourceSetList indicates a list of SSB resources used for beam management and reporting in one resource set. The UE receives a CSI-ResourceConfig IE including csi-SSB-ResourceSetList including SSB resources used for BM from the BS (S410).

In this case, the SSB resource set may be set to {SSBx1, SSBx2, SSBx3, SSBx4, . . . }, and SSB indices may be defined from 0 to 63. The UE may receive the SSB resources from the BS based on csi-SSB-ResourceSetList (S420). When CSI-RS reportConfig related to SSBRI and RSRP reporting is configured, the UE may report (beams with) the best SSBRI and RSRP related thereto to the BS (S1130). That is, if reportQuantity of the CSI-RS reportConfig IE is set to 'ssb-Index-RSRP', the UE may report the best SSBRI and RSRP related thereto to the BS. If a CSI-RS resource is configured in the same OFDM symbol(s) as the SSB (or SS/PBCH Block) and if 'QCL-TypeD' is applicable, the UE may assume that the CSI-RS and SSB are quasi co-located (QCLed) in terms of 'QCL-TypeD'. Here, QCL-TypeD may mean that antenna ports are QCLed in terms of spatial Rx parameters. When the UE perform reception on a plurality of DL antenna ports in the QCL-TypeD relationship, the UE may apply the same Rx beam. In addition, the UE may not expect that the CSI-RS will be configured in REs overlapping with those of the SSB.

DL BM Procedure Based on CSI-RS

When the UE is configured with NZP-CSI-RS-ResourceSet where repetition (higher layer parameter) is set to 'ON', the UE may assume that one or more CSI-RS resources in NZP-CSI-RS-ResourceSet are transmitted through the same DL spatial domain transmission filter. That is, the one or more CSI-RS resources in NZP-CSI-RS-ResourceSet may be transmitted on the same Tx beam. In this case, the one or sion filter. That is, the one or more CSI-RS resources in NZP-CSI-RS-ResourceSet may be transmitted through different Tx beams. When repetition is set to 'OFF', it may be related to the Tx beam sweeping process of the BS. In addition, the parameter repetition may be configured only for CSI-RS resource sets associated with CSI-ReportConfig having a report of L1-RSRP or 'No Report (or None)'.

When the UE is configured with CSI-ReportConfig where reportQuantity is set to 'cri-RSRP' or 'none', if CSI-ResourceConfig (higher layer parameter resourcesForChannelMeasurement) for channel measurement does not include a higher layer parameter 'trs-Info' but includes NZP-CSI-RS-ResourceSet where the higher layer parameter 'repetition' is set to 'ON' (repetition=ON), the UE may be configured only with the same number of ports (1-port or 2-port) having a higher layer parameter 'nrofPorts' for all CSI-RS resources in NZP-CSI-RS-ResourceSet. Specifically, the CSI-RS may be used as follows. For a specific CSI-RS resource set, if the parameter repetition is configured and TRS_info is not configured, the CSI-RS may be used for BM. If the parameter repetition is not configured and TRS_info is configured, the CSI-RS may be used as a tracking reference signal (TRS). If the parameter repetition is not configured and TRS_info is not configured, the CSI-RS may be used for CSI acquisition.

Figure 13:
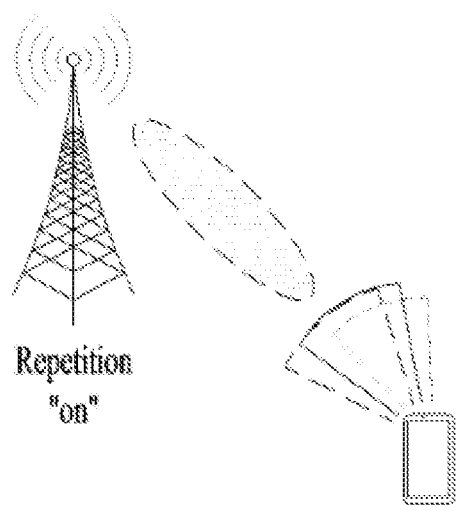
FIG. 13 illustrates an example of a DL beam management procedure using CSI-RS.
Figure 13:
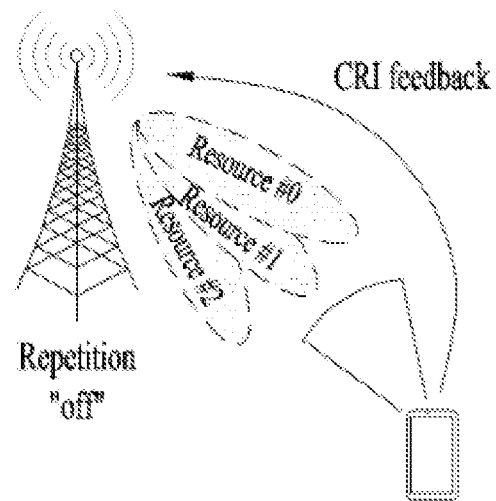

FIG. 13 illustrates an exemplary DL BM procedure based on the CSI-RS. FIG. 13(a) illustrates an Rx beam determination (or refinement) process of the UE, and FIG. 13(b) illustrates a Tx beam determination process of the BS. Specifically, FIG. 13(a) shows a case where the parameter repetition is set to 'ON', and FIG. 13(b) shows a case where the parameter repetition is set to 'OFF'.

Figure 14:
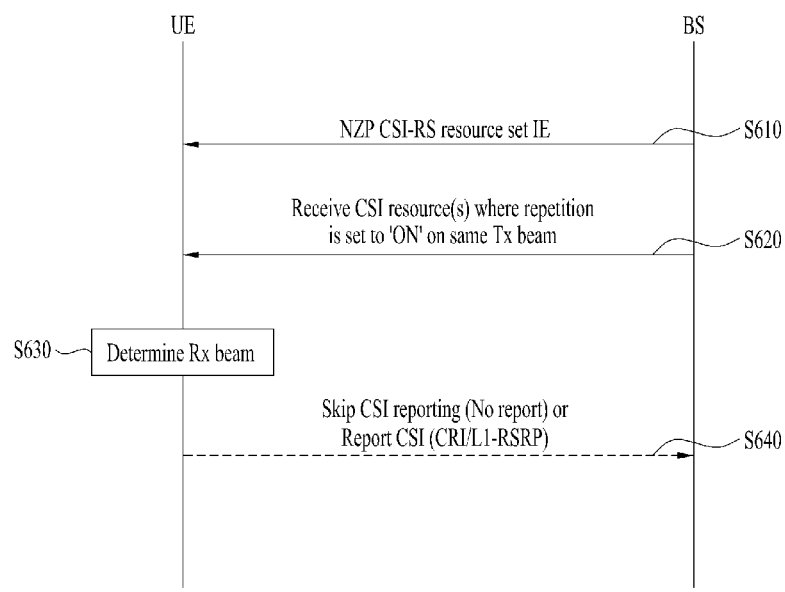
FIG. 14 is a flowchart illustrating an example of an Rx beam determination process of a terminal.

FIG. 14 is a flowchart illustrating the Rx beam determination process of the UE.

The Rx beam determination process of the UE will be described with reference to FIGS. 13(a) and 14.

Figure 15:
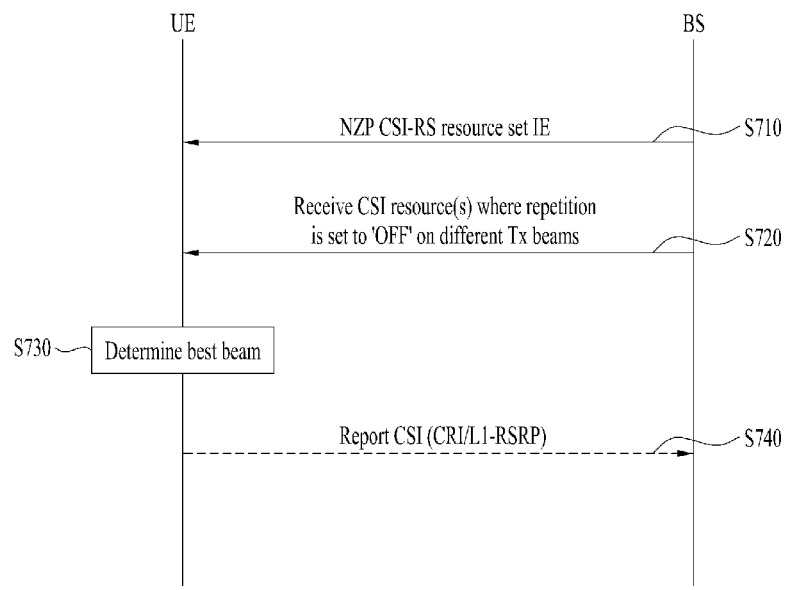
FIG. 15 is a flowchart illustrating an example of a transmission beam determination process of a base station.

The UE may receive a NZP CSI-RS resource set IE including the higher layer parameter repetition from the BS through RRC signaling (S610). In this case, the parameter repetition may be set to 'ON'. The UE may repeatedly receive resource(s) in the CSI-RS resource set in which repetition is set to 'ON' through the same Tx beam (or the same DL spatial domain transmission filter) of the BS in different OFDM symbols (S620). By doing so, the UE may determine its Rx beam (S630). The UE may not perform CSI reporting or transmit a CSI report including a CRI and L1-RSRP to the BS (S640). In this case, reportQuantity of CSI-ReportConfig may be set to 'No report (or None)' or 'CRI+L1-RSRP'. That is, when repetition is set to 'ON', the UE may skip CSI reporting. Alternatively, the UE may report information on the ID (CRI) of a preferred beam related to a beam pair and the quality (L1-RSRP) thereof FIG. 15 is a flowchart illustrating the Tx beam determination process of the BS.

The Tx beam determination process of the BS will be described with reference to FIGS. 13(b) and 15.

The UE may receive a NZP CSI-RS resource set IE including the higher layer parameter repetition from the BS through RRC signaling (S710). In this case, the parameter repetition may be set to 'OFF' and related to the Tx beam sweeping process of the BS. The UE may receive resources in the CSI-RS resource set in which repetition is set to 'OFF' through different Tx beams (or different DL spatial domain transmission filters) of the BS (S720).

The UE may select (or determine) the best beam (S740). The UE may report the ID of the selected beam and quality information related thereto (e.g., L1-RSRP) to the BS (S740). In this case, reportQuantity of CSI-ReportConfig may be set to 'CRI+L1-RSRP'. That is, when the CSI-RS is transmitted for the BM, the UE may report the CRI and L1-RSRP therefor to the BS.

Figure 16:
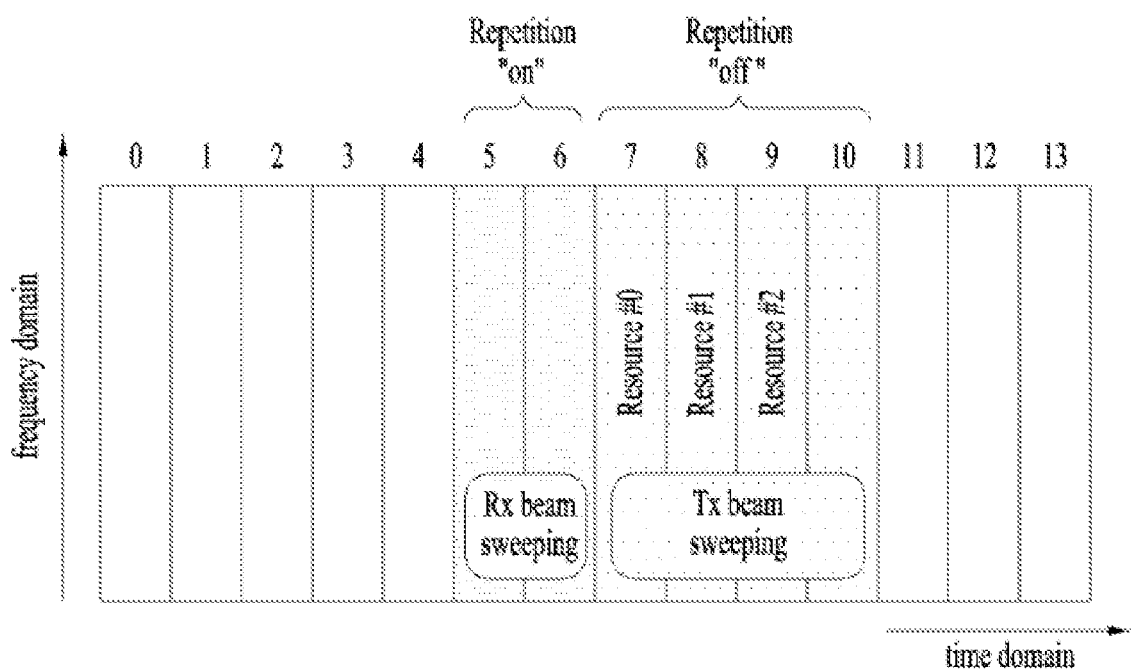
FIG. 16 illustrates an example of resource allocation in time and frequency domains related to the operation of FIG. 13.

FIG. 16 is a diagram illustrating exemplary resource allocation in the time and frequency domains in relation to the operation of FIG. 13. For a CSI-RS resource set, if repetition is set to 'ON', a plurality of CSI-RS resources may be repeatedly used by applying the same Tx beam. If repetition is set to 'OFF' for the CSI-RS resource set, different CSI-RS resources may be transmitted on different Tx beams.

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

In NR, the UE may support beamforming-based reception for DL reception. That is, the UE may receive a DL signal on a specific beam among a plurality of candidate beams. In particular, when the UE is in connected mode, the BS and UE may maintain an optimal beam for the UE through the BM procedure. Accordingly, the BS may transmit a PDCCH/PDSCH on the optimal TX beam suitable for the UE, and the UE may receive the PDCCH/PDSCH on the optimal RX beam.

In REL-17 NR, an improved paging transmission/reception method is being discussed for a UE in a stationary state or with low mobility. When the UE is in the stationary state or moves only in a specific space such as an indoor space, a factory, etc., the UE may be expected to maintain the optimal beam for a long time. Accordingly, the present disclosure proposes an efficient paging transmission/reception method for a UE with low or limited mobility.

According to the present disclosure, when a network designates a UE as a stationary UE, a UE with low mobility, or a UE with limited mobility or when the UE determines by itself that the UE is in the stationary state, low mobility state, or limited mobility state, if the measurement quality of a specific beam resource designated by the BS is above a prescribed level, the UE may monitor and receive a paging transmission resource mapped to the specific beam resource. In addition, when the measurement quality of the specific beam resource is less than the prescribed level, the UE may select a new beam resource and report the new beam resource to the BS so that paging transmission may be performed on the new beam resource.

1) Transmitter (BS)

Figure 17:
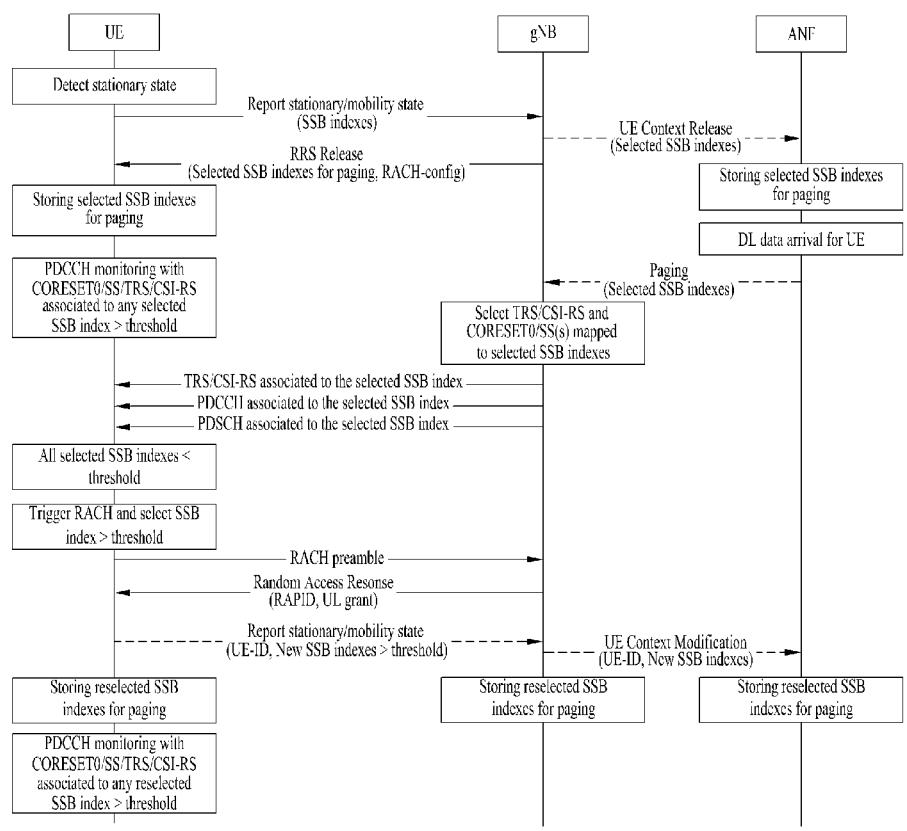
FIG. 17 illustrates a paging transmission and reception process according in various embodiments of the present disclosure.

FIG. 17 illustrates a paging transmission/reception process according to various embodiments of the present disclosure.

In the present disclosure, the BS may identify whether the UE is in the stationary state, low mobility state, or limited mobility state. For example, the BS may identify the state of the UE based on subscriber information provided by an access and mobility management function (AMF), which is a core network node. Alternatively, the BS may identify the state of the UE by continuously obtaining the location of the UE based on positioning or handover frequency.

The BS may instruct the UE to report the stationary/mobility state while the UE is in the above-described state. In an exemplary embodiment, if such reporting is configured by an RRC reconfiguration message, the UE may report the state of the UE periodically, once whenever the cell changes, or when the state changes. The state report may inform that the UE is in the stationary state, is moving only in a specific area (e.g., indoor space, factory, etc.), or is moving at or below a specific speed or at or above the specific speed.

When a specific area is reported, global navigation satellite system (GNSS) information and the radius of the area may be included. For example, the specific area may be represented as a quadrangle or circle. When the area has a quadrilateral shape, the UE may report information on the GNSS positions of the four points. Alternatively, the UE may report information on the GNSS position of the central point and the length of each side. When the area has a circular shape, the UE may report information on the GNSS position of the center point and the diameter or radius. Alternatively, the BS may divide a geographic location on the earth into a plurality of zones, each has a quadrilateral or circular shape, and assign an ID to each zone. The UE may report to the BS the IDs of one or multiple zones related to a limited area where the UE moves so that the UE may inform that the UE moves within the limited area.

By transmitting such a report message, the UE may report an SSB index with the highest quality in the current serving cell and one or more SSB indices with quality above a threshold together with RSRP/RSRQ measurement results thereof.

Alternatively, when the SSB index with the highest quality in the current serving cell for a prescribed period of time or the one or more SSB indices with quality above the threshold for a prescribed period of time are newly determined based on the configuration of the BS, the UE may periodically report to the BS the SSB index with the highest quality in the current serving cell and the one or more SSB indices with quality above the threshold together with RSRP/RSRQ measurement results thereof. In this case, the UE may also report the stationary/mobility state of the UE to the BS.

The RSRP/RSRQ measurement results are obtained by applying L1 filtering or L3 filtering.

ID), a specific frequency (e.g. ARFCN), or the corresponding UE. ThreshSS is a threshold for an SSB selected/reselected for paging reception, and ThreshCSIRS is a threshold for a CSI-RS selected/reselected for paging reception.

TABLE 8

| | |
|---|---|
| ThreshSS | ThresholdNR |
| ThreshCSIRS | ThresholdNR |
| smtc-list | SSB-MTC |
|   periodicityAndOffset | |
|   duration ENUMERATED {sf1, sf2, sf3, sf4, sf5}, | |
|   pci-List-r16 | SEQUENCE (SIZE (1..maxNrofPCIsPerSMTC)) OF PhysCellId OPTIONAL |
|   bestssb-ToMeasure | SSB-set |

After receiving the state report from the UE, the BS may select the SSB index with the highest quality reported by the UE or some or all of the one or more SSB indices with quality above the threshold if the UE satisfies specific conditions. The BS may perform paging transmission based on the selected SSB index (or SSB indices) as shown in FIG. 17. The specific conditions may include the following cases: when the UE is in the stationary state; when the UE is moving only within a specific area (e.g., indoors, factory, etc.); or when the SSB index with the highest quality or the one or more SSB indices with quality above the threshold are maintained in the current serving cell for a prescribed period of time.

For paging transmission of a specific UE, the BS may provide the AMF, which is a core network node, with information on the current serving cell of the specific UE and information on an SSB index with the highest quality in the corresponding serving cell or one or more SSB indices with quality above a threshold. Alternatively, the BS may provide information on one or more SSB indices selected for the UE. The AMF may store the information in the UE context of the corresponding UE. The information includes the UE ID of the UE.

The BS may instruct the UE to switch to the RRC_IDLE or RRC_INACTIVE state according to the command of the AMF or the determination of the BS. To this end, the BS may transmit an RRC release message to the UE. Alternatively, the BS may broadcast some or all of the following configuration information in system information.

The RRC release message may include information on one or multiple cells and information on one or multiple SSB indices selected by the BS for the corresponding cell. For example, the cell may be the serving cell of the UE, and the SSB index may correspond to an SSB index with the highest quality in the serving cell or one or more SSB indices with quality above a threshold, which are reported by the UE.

The RRC release message may include RACH configuration information available in the RRC_IDLE or RRC_INACTIVE mode. For example, the RRC release message may include a RACH resource (e.g., RACH preamble index, RACH occasion, etc.) mapped to an SSB index included in the RRC release message. Such a RACH resource may be allocated as a UE-dedicated resource for executing a UE-dedicated RACH procedure.

The RRC Release message may include information in Table 8 below for a specific cell ID (PCI: Physical Cell In Table 8, bestssb-ToMeasure denotes an SSB set composed of one or multiple SSB indices that the UE preferentially selects when performing SSB measurement. The UE may measure SSB indices selected by the BS according to SSB-MTC. If a certain SSB index is the best SSB or more than equal to the threshold, the UE may receive paging transmission mapped to the corresponding SSB index when receiving paging.

When the UE is in RRC_IDLE, if DL data for the UE arrives at the 3GPP network, the AMF may instruct the BS to transmit paging. In this case, the AMF may transmit information on a selected SSB index information stored in the UE context of the corresponding UE to the BS. Accordingly, the BS may determine paging transmission based on the selected SSB index. When the UE is in RRC_INACTIVE, if DL data for the UE arrives at an anchor BS, the anchor BS may transmit paging or instruct a neighboring BS to transmit paging. In this case, the anchor BS may transmit information on a selected SSB index stored in the UE context of the corresponding UE to the neighboring BS. A paging message may be transmitted together with a paging transmission command, and the paging message may include the UE ID of the UE.

If there is paging for the UE, the BS may transmit a TRS, a CSI-RS, or a wake-up signal (WUS) before paging transmission to improve the paging reception capability of the UE. In this case, the BS may transmit TRS(s), CSI-RS(s), or WUS(s) mapped to one or more SSB indices selected for the UE. In other words, the BS may assume that the UE receives a TRS, CSI-RS, or WUS in a TCI state corresponding to at least one SSB index among the selected SSB indices.

If there is paging for the UE, the BS may transmit DCI in CORESET0 and a search space set mapped to the selected SSB indices. The DCI may include an indicator indicating one or multiple UEs, and the DCI may be transmitted on a paging occasion for the UE.

The BS may transmit a PDSCH on frequency and time resources scheduled by DCI. A transport block (TB) transmitted on the PDSCH may include a paging message, and the paging message may include the UE ID of the UE.

2) Receiver (UE)

According to the configuration of the BS, the UE may report to the BS whether the UE is in the stationary state or the mobility state. In an exemplary embodiment, if such reporting is configured by an RRC reconfiguration message, the UE may report the state of the UE periodically, once whenever the cell changes, or when the state changes. The state report may inform that the UE is in the stationary state, is moving only in a specific area (e.g., indoor space, factory, etc.), or is moving at or below a specific speed or at or above the specific speed.

Alternatively, when an SSB index with the highest quality in the current serving cell for a prescribed period of time or one or more SSB indices with quality above a threshold for a prescribed period of time are newly determined based on the configuration of the BS, the UE may periodically report to the BS the SSB index with the highest quality in the current serving cell and the one or more SSB indices with quality above the threshold together with RSRP/RSRQ measurement results thereof. In this case, the UE may also report the stationary/mobility state of the UE to the BS.

Upon receiving the RRC release message from the BS, the UE may switch to the RRC_IDLE or RRC_INACTIVE state. The RRC release message may include information on one or multiple cells and information on one or multiple SSB indices selected by the BS for the corresponding cell. For example, the cell may be the serving cell of the UE, and the SSB index may correspond to an SSB index with the highest quality in the serving cell or one or more SSB indices with quality above a threshold, which are reported by the UE.

The UE may enter the RRC_IDLE or RRC_INACTIVE state, select one cell by performing a cell selection process, and camp on the selected cell. In this process, the UE may perform DL synchronization based on transmission of an SSB transmission in the corresponding cell and receive an MIB and SIB1 broadcasted by the cell.

If the cell is included in the RRC release message, the UE may measure the SSB of the cell. If the index of the SSB included in the RRC release message is above a threshold or the SSB index is the best SSB index, the UE may measure a TRS/CSI-RS related to its paging occasion based on a beam resource of the corresponding SSB index. In addition, the UE may measure a WUS based on the beam resource of the SSB index. The BS may transmit multiple TRSs/CSI-RSs or multiple WUSs for multiple SSB indices, but the UE may receive a TRS/CSI-RS or a WUS by assuming a resource or a Tx/Rx beam mapped to the SSB index for the UE. If the TRS/CSI-RS or WUS is detected or if the WUS indicates wake-up, the UE may perform PDCCH monitoring.

The UE may perform the PDCCH monitoring during its paging occasion (PO) by selecting CORESET0 and a search space set mapped to the corresponding SSB index. If the UE receives DCI that is CRC-masked with a P-RNTI during the PO, the UE may receive a PDSCH based on the DCI and a TCI state mapped to the corresponding SSB index.

The UE may periodically measure an SSB burst of the serving cell. In particular, the UE may measure one or more SSB indices of the serving cell, which are selected by the BS and indicated in the RRC release message. When the indicated one or more SSB indices are not the best SSB index for a prescribed period of time, when the measurement quality of the SSB indices is lower than that of other SSB indices, or when the measurement quality of all the indicated one or more SSB indices is below ThreshSS for a prescribed period of time, the UE may report the latest measurement results of the current serving cell to the BS if the UE still camps on the current serving cell. For example, the UE may report the latest measurement results for the one or more SSB indices. Alternatively, the UE may report one or more SSB indices of the current serving cell for which the latest measurement results are above ThreshSS and measurement results thereof. In addition, the UE may report whether the UE is in the stationary state or mobility state. To this end, the UE may trigger a RACH if the UE is in RRC_IDLE or RRC_INACTIVE.

In addition, the UE may report the stationary/mobility state to the BS when the movement state changes. For example, when the UE starts to move from the stationary state or transitions from a low-speed movement state to a high-speed movement state, the UE may trigger the RACH to report the state change to the BS. In this case, the UE may report the latest measurement results for the one or more SSB indices. Alternatively, the UE may report one or more SSB indices of the current serving cell for which the latest measurement results are above ThreshSS and measurement results thereof.

When the RACH is triggered, the UE may select a PRACH resource mapped to the best SSB index or an SSB index above ThreshSS. For example, when the RACH is triggered, the UE may obtain RACH configuration information from the RRC release message or system information and then select a PRACH preamble index and a PRACH occasion mapped to the SSB index. The BS may provide UE-dedicated RACH resources in the RRC release message. In this case, the UE may select a UE-dedicated PRACH preamble index and a UE-dedicated PRACH occasion mapped to the SSB index. If there is no UE-dedicated PRACH resource mapped to the SSB index, the UE may select a contention-based RACH resource mapped to the SSB index.

The UE may transmit a PRACH preamble or RACH MsgA on the selected PRACH resource and receives a random access response (RAR) or RACH MsgB. If the RAR message includes a RAPID mapped to the PRACH preamble index selected by the UE, the UE may determine that the RACH procedure is successful and terminate the RACH procedure. If the RAR message includes a UL grant together with the RAPID, the UE may transmit a Msg3 PUSCH based on the UL grant. The Msg3 PUSCH may carry a TB including information reported by the UE. In the case of the 2-step RACH procedure, the TB including the information reported by the UE may be transmitted in MsgA. The information reported by the UE may include some or all of the following.

The ID of the serving cell

The best SSB index of the serving cell or one or more SSB indices above ThreshSS recently measured by the UE for a certain period of time RSRP/RSRQ measurement results of the one or more SSB indices Whether the UE is in the stationary state or the movement speed/state of the UE The UE ID of the UE (e.g., one of a C-RNTI, I-RNTI, s-TMSI, and IMSI)

If a contention-fee RACH procedure is performed on UE-dedicated PRACH resources, the BS may not identify an SSB index newly selected by the UE. In this case, since Msg3 transmission may not be necessary, the BS may terminate the RACH procedure without Msg3 by including no UL grant in the RAR. On the other hand, if a contention-based RACH procedure is performed, the BS may require Msg3 transmission or MsgA transmission to determine which UE performs transmission. Therefore, in the 4-step RACH procedure, the BS may allocate a UL grant for Msg3 transmission as the RAR.

When the RACH procedure is successful, the UE and BS may perform paging transmission/reception based on one or more SSB indices newly reported by the UE. The BS may reselect an SSB index for paging transmission based on the one or more SSB indices newly reported by the UE and then report the reselected SSB index to the AMF.

Thereafter, the UE may perform PDCCH monitoring for paging reception based on the newly reported SSB index.

The paging transmission/reception method may also be applied to transmission and reception of system information or data for the UE. In this case, the paging message is replaced with a system information message, DL data, or DCI.

Figure 18:
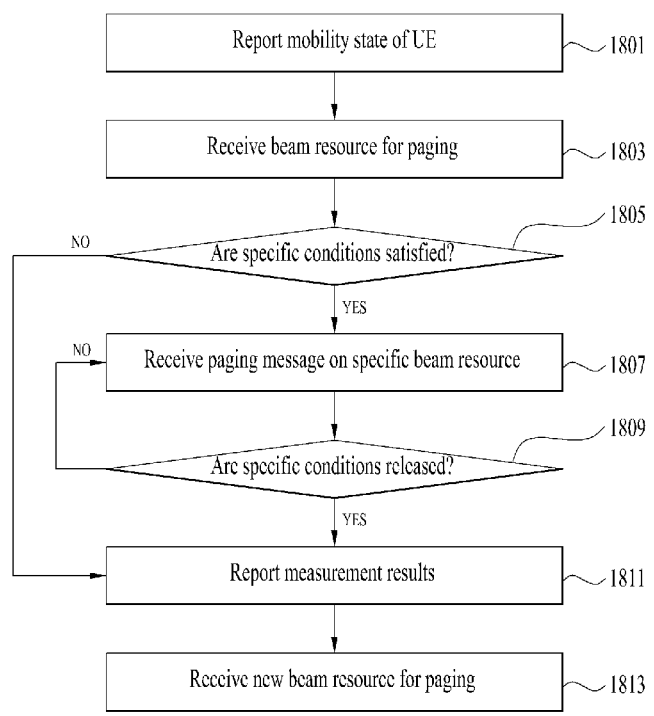
FIG. 18 illustrates a method of receiving paging by a user equipment in various embodiments of the present disclosure.

FIG. 18 is a diagram illustrating a method for a UE to receive paging.

The UE may inform a BS whether the UE is in the stationary state or mobility state (1801). The UE may report its state to the BS periodically, whenever a cell changes, or when the state changes. According to the configuration of the BS, the UE may report an SSB index having the highest quality in the current serving cell for a prescribed period of time or one or more SSB indices with quality above a threshold for a prescribed period of time together with RSRP/RSRQ measurement results thereof.

The UE may receive information on a beam resource for paging from the BS (1803). The information on the beam resource may be received through RRC signaling, and the information may include information on one or multiple cells and information on one or multiple SSB indices selected by the BS for the corresponding cells. The one or more SSB indices selected by the BS may be determined from among the SSB index with the highest quality in the serving cell or the SSB indices with quality above the threshold, which are reported by the UE.

When specific conditions are satisfied (1805), the UE may receive a paging message on the beam resource selected by the BS (1807).

If the specific conditions are not satisfied (1805), the UE may periodically measure an SSB burst of the serving cell and report the latest measurement results of the current serving cell to the BS. Specifically, the UE may periodically measure the SSB burst of the serving cell. In particular, the UE may measure one or more SSB indices of the serving cell selected by the BS and indicated in an RRC message. When the indicated one or more SSB indices are not the best SSB index for a prescribed period of time, when the measurement quality of the SSB indices is lower than that of other SSB indices, or when the measurement quality of all the indicated one or more SSB indices is below ThreshSS for a prescribed period of time, that is, when the specific conditions are not satisfied, the UE may report the latest measurement results of the current serving cell to the BS if the UE still camps on the current serving cell.

Specifically, information reported by the UE to the BS may include at least one of the following.

The ID of the serving cell

The best SSB index of the serving cell or one or more SSB indices above ThreshSS recently measured by the UE for a certain period of time RSRP/RSRQ measurement results of the one or more SSB indices Whether the UE is in the stationary state or the movement speed/state of the UE The UE ID of the UE (e.g., one of a C-RNTI, I-RNTI, s-TMSI, and IMSI)

The BS may perform paging transmission/reception based on one or more SSB indices newly reported by the UE. The BS may reselect an SSB index for paging transmission based on the one or more SSB indices newly reported by the UE and then report the reselected SSB index to an AMF.

The UE may receive paging based on the newly reported SSB index (1813).

When the specific conditions are released (1809), the UE may report the latest measurement results to the BS (1811) and receive information on a new beam resource. The UE may perform PDCCH monitoring for paging reception based on the newly reported measurement results and receive paging on the new beam resource (1813).

According to various embodiments of the present disclosure, a UE with low mobility including a stationary UE may report information on the best beam maintained for a prescribed period of time or information on beams above a threshold, and the BS may perform paging transmission or DL transmission based on the reported beam information, thereby achieving efficient signal transmission and reception between the UE and BS.

Figure 19:
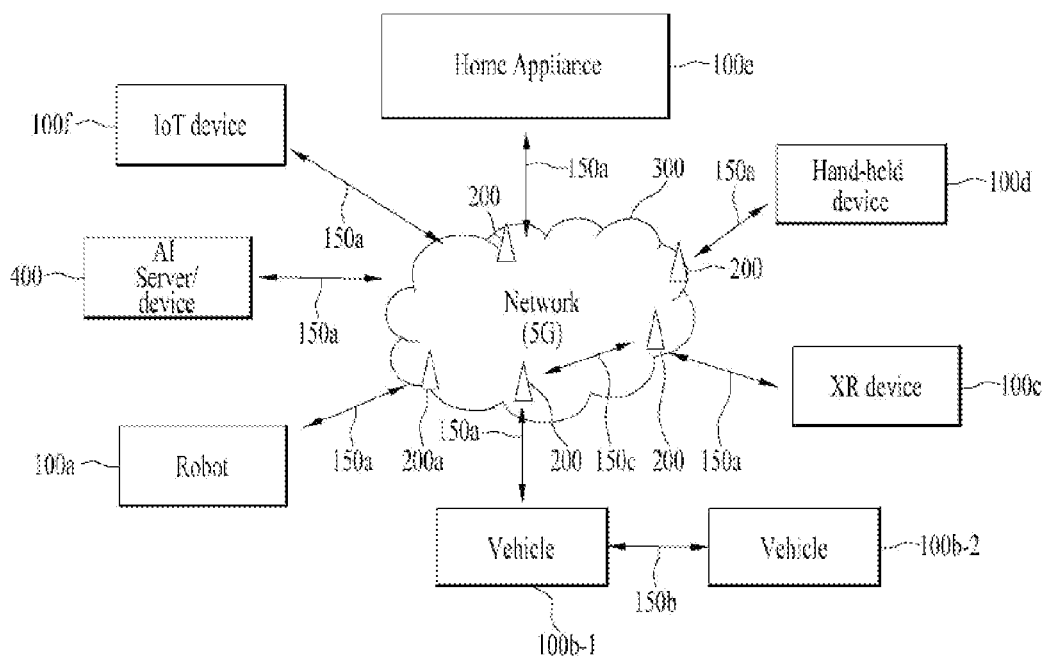
FIG. 19 to FIG. 22 illustrate a communication system 1 and wireless devices applied to the present disclosure.

FIG. 19 illustrates a communication system 1 applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
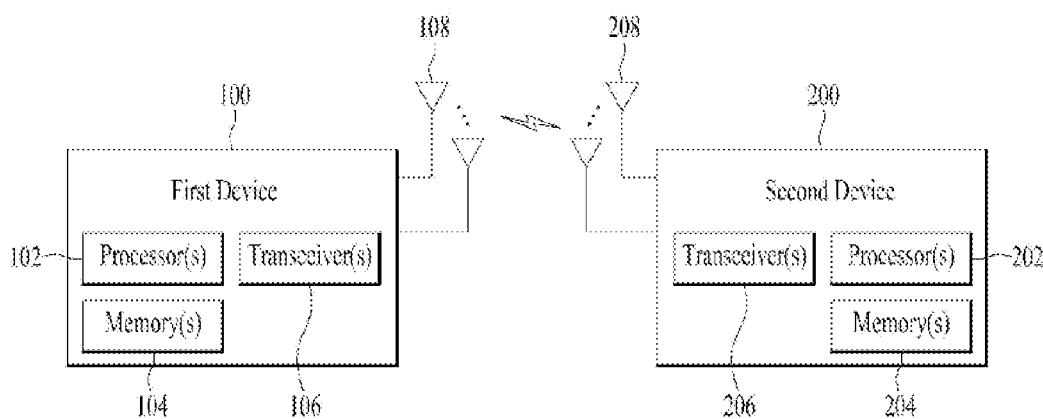

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
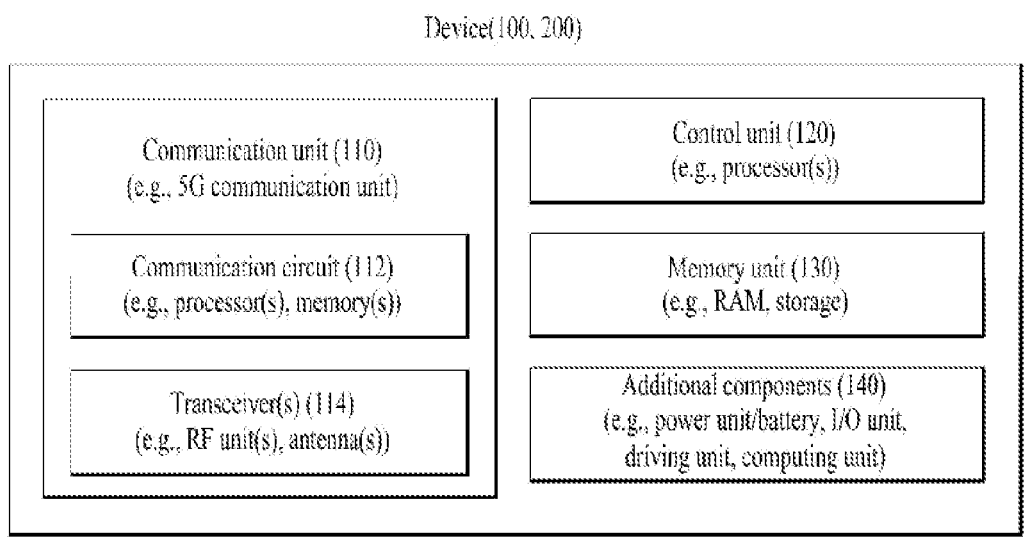

FIG. 21 illustrates another example of a wireless device applied to the present disclosure. The wireless device may be implemented in various forms according to a use-case/service (refer to FIG. 21).

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
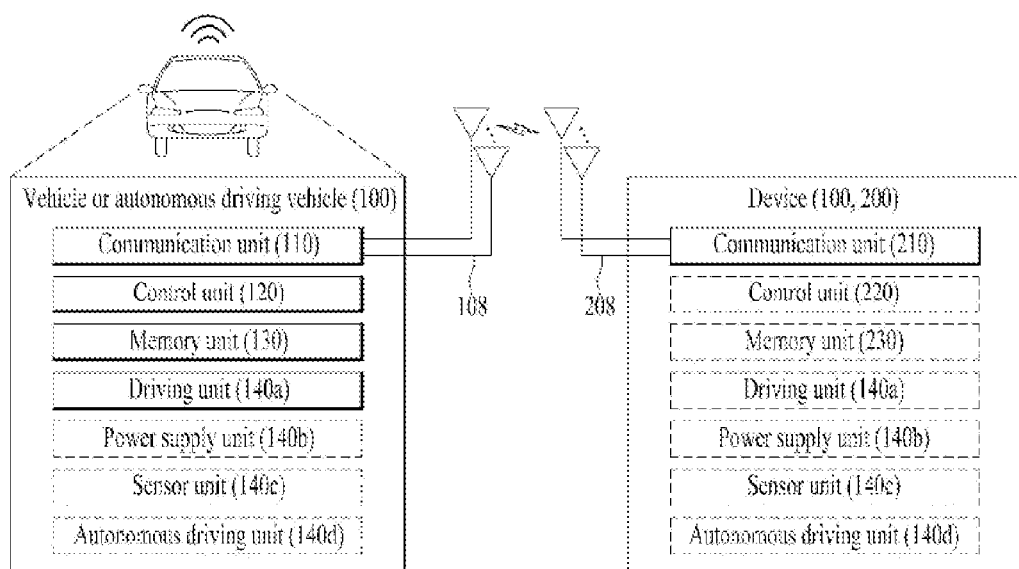

FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 23:
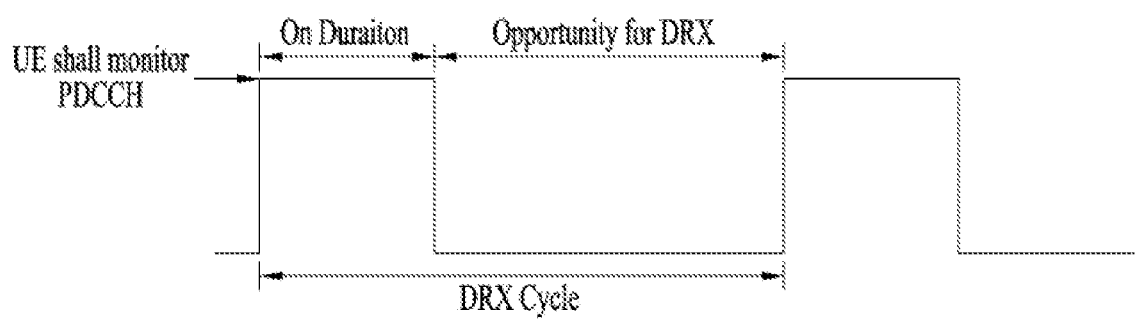
FIG. 23 illustrates an exemplary discontinuous reception (DRX) operation applied to the present disclosure.

FIG. 23 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 23, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 9 describes a DRX operation of a UE (in the RRC_CONNECTED state). Referring to Table 9, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 23.

TABLE 9

| | Type of signals | UE procedure |
|---|---|---|
| $1^{st}$ step | RRC signalling(MAC-CellGroupConfig) | Receive DRX configuration information |
| $2^{nd}$ Step | MAC CE((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group.

MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of transmitting and receiving signals by a user equipment (UE) in a wireless communication system, the method comprising:
transmitting information on a mobility state of the UE;
receiving configuration information on one or more specific beam resources for paging; and
receiving a paging message on the specific beam resources based on measurement quality of the specific beam resources greater than or equal to a specific threshold,
wherein the specific beam resources are determined based on one or more synchronization signal/sequence block (SSB) indices or one or more channel state information reference signals (CSI-RSs), and
wherein the configuration information includes at least one of a random access channel (RACH) configuration available for the UE in radio resource control (RRC) IDLE or RRC INACTIVE mode, or the specific threshold for paging.

2. The method of claim 1, wherein the information on the mobility state of the UE includes information on one or more SSB indices with highest quality in a serving cell or one or more SSB indices with quality greater than or equal to the specific threshold and reference signal received power (RSRP) or reference signal received quality (RSRQ) measurement values related to the one or more SSB indices.

3. The method of claim 2, wherein the configuration information further includes:
1) Information on one or more cells; and
2) information on one or more specific SSB indices selected for the one or more cells among the one or more SSB indices included in the information on the mobility state of the UE.

4. The method of claim 3, further comprising receiving downlink control information (DCI) based on the one or more specific SSB indices.

5. The method of claim 4, comprising receiving a transport block (TB) including the paging message over a physical downlink shared channel (PDSCH) based on the DCI.

6. The method of claim 2, further comprising receiving a tracking reference signal (TRS), a CSI-RS, or a wake-up signal (WUS) related to at least one SSB index among the one or more SSB indices included in the information on the mobility state of the UE.

7. The method of claim 1, comprising:
reselecting new beam resources based on the measurement quality of the specific beam resources less than the specific threshold;
transmitting information on the new beam resources to a base station;
receiving information on a second beam resource for paging based on the new beam resources; and
receiving the paging message on the second beam resource,
wherein the second beam resource is determined from among the new beam resources selected by the UE.

8. A nonvolatile computer-readable medium having recorded thereon a program code for executing the method defined in claim 1.

9. A user equipment (UE) operating in a wireless communication system, the UE comprising:
a transceiver; and
one or more processors connected to the transceiver,
wherein the transceiver is configured to:
transmit information on a mobility state of the UE;
receive configuration information on one or more specific beam resource for paging; and
receive a paging message on the specific beam resources based on measurement quality of the specific beam resources greater than or equal to a specific threshold,
wherein the specific beam resources are determined based on one or more synchronization signal/sequence block (SSB) indices or one or more channel state information reference signals (CSI-RSs), and
wherein the configuration information includes at least one of a random access channel (RACH) configuration available for the UE in radio resource control (RRC) IDLE or RRC INACTIVE mode, or the specific threshold for paging.

10. The UE of claim 9, wherein the information on the mobility state of the UE includes information on one or more SSB indices with highest quality in a serving cell or one or more SSB indices with quality greater than or equal to the specific threshold and reference signal received power (RSRP) or reference signal received quality (RSRQ) measurement values related to the one or more SSB indices.

11. The UE of claim 10, wherein the configuration information further includes:
1) Information on one or more cells; and
2) information on one or more specific SSB indices selected for the one or more cells among the one or more SSB indices included in the information on the mobility state of the UE.

12. The UE of claim 11, wherein the transceiver is configured to receive downlink control information (DCI) based on the one or more specific SSB indices.

13. The UE of claim 12, wherein the transceiver is configured to receive a transport block (TB) including the paging message over a physical downlink shared channel (PDSCH) based on the DCI.

14. The UE of claim 9, wherein the one or more processors are configured to reselect new beam resources based on the measurement quality of the specific beam resources less than the specific threshold, and
wherein the transceiver is configured to:
transmit information on the new beam resources to a base station;

receive information on a second beam resource for paging based on the new beam resources; and receive the paging message on the second beam resource, and wherein the second beam resource is determined from among the new beam resources selected by the UE.

\* \* \* \* \*